(No Model.)
H. M. WATERMAN.
EXTENSION GAGE.
No. 302,069. Patented July 15, 1884.
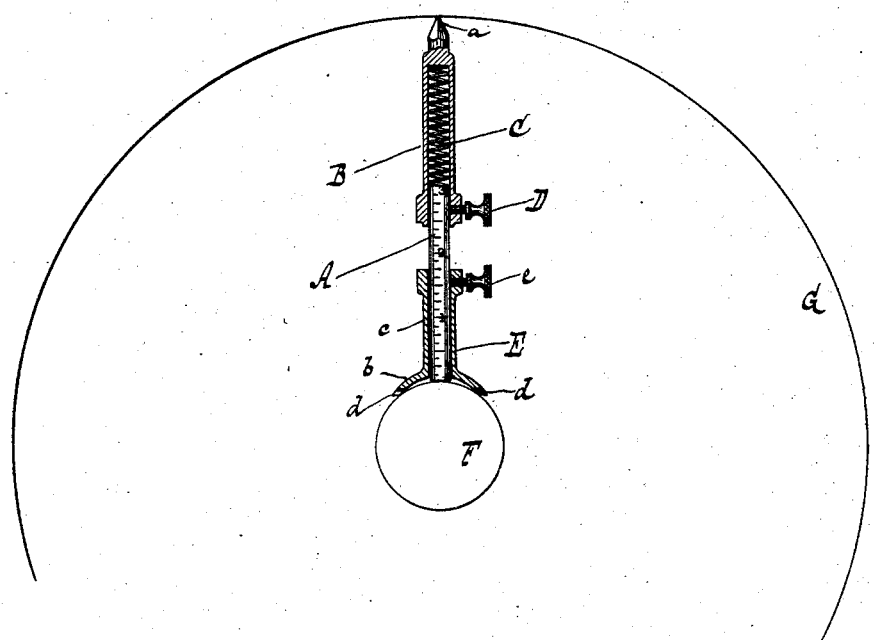
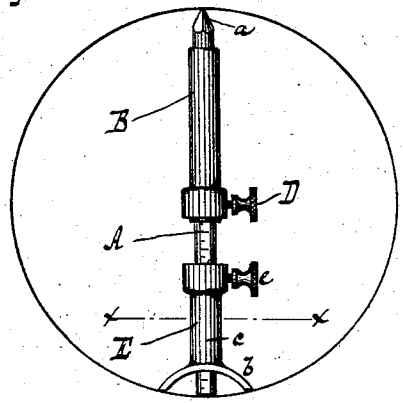
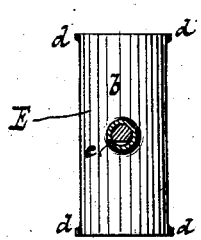
WITNESSES:
Otto Hufeland
William Miller
INVENTOR
Henry M. Waterman
BY Van Santvoord & Stauf
ATTORNEYS

UNITED STATES PATENT OFFICE.

HENRY M. WATERMAN, OF BROOKLYN, NEW YORK.

EXTENSION-GAGE.

SPECIFICATION forming part of Letters Patent No. 302,069, dated July 15, 1884.

Application filed April 24, 1884. (No model.)

*To all whom it may concern:*

Be it known that I, HENRY M. WATERMAN, a citizen of the United States, residing at Brooklyn, in the county of Kings and State of New York, have invented new and useful Improvements in Extension-Gages, of which the following is a specification.

This invention relates to a gage composed of a graduated bar, an extension-slide, a spiral spring, and a set-screw. With these parts is further combined a foot-piece, which serves to adjust the gage on a convex or on a concave surface—as, for instance, in adjusting the boring-bar in the interior of a cylinder or in measuring the diameter of a cylinder.

In the accompanying drawings, Figure 1 represents a longitudinal central section of my gage. Fig. 2 is a front view. Fig. 3 is a horizontal section in the plate $x\ x$, Fig. 2.

Similar letters indicate corresponding parts.

In the drawings, the letter A designates a graduated bar, the scale marked on the bar indicating inches and fractions thereof, or any other scale for the measurement of length. On this bar is fitted a slide, B, which is subjected to the action of a spring, C, and provided with a set-screw, D. In the example shown in the drawings the bar A is solid, and the slide B consists of a tube which fits the bar and can be moved thereon in the direction of its length, the spring C being placed into the tubular slide, so as to have a tendency to force the same outward. If desired, however, the graduated bar A may be made in the form of a tube, and the slide B in the form of a solid bar fitting the interior of this tube, and in this case the spring C would be placed into the graduated tube A. I do not wish to confine myself, therefore, to the precise form of the graduated bar and of the slide, as represented in the drawings, but reserve the right to select for the parts above mentioned any form suitable for my purpose. The outer end of the slide B is provided with a point, $a$, and the end of the graduated bar A is rounded or also made in the form of a point, so that a correct measure can be taken, as will be presently explained.

With the graduated bar A is combined a foot-piece, E, which is composed of a convex plate, $b$, and a tubular socket, $c$, bored out to receive the bar A. The plate B is provided at its corner with feet $d$, and the socket $c$ is provided with a set-screw, $e$. If it is desired to measure the distance between the outer circumference of a rod, F, for instance, and the inner circumference of a cylinder, G, Fig. 1, the foot-piece E is placed upon the rod F, and the graduated bar is permitted to drop until it bears upon the circumference of said rod, and then it is secured by the set-screw $e$. The slide B is then released, so that it can follow the action of the spring C, and when its point $a$ touches the inner circumference of the cylinder said slide is secured in position by the set-screw D. If the length of the slide B from its point to its butt-end is three inches and the bar A projects two and three-eighths inches, the distance between the rod F and inner circumference of the cylinder G is five and three-eighths inches. If the rod F is exactly in the center of the cylinder, the gage can be moved round the bar, and the point of the slide B will remain in contact with the inner circumference of the cylinder; but if the rod F is not in the center of the cylinder its true position can be ascertained by turning the set-screw D backward, so as to release the slide B, and if the gage is then moved round the rod F the slide B will move in or out, and by observing these movements the rod F can be brought in the center of the cylinder, and at the same time any inequalities existing in the inner surface of the cylinder can be ascertained.

In order to measure the diameter of a cylinder, the foot-piece E is adjusted in the cylinder, as shown in Fig. 2, the bar A is permitted to drop until it rests on the inner surface of the cylinder, and in that position it is secured by the set-screw $e$. The slide B is then permitted to follow the action of the spring C until its point touches the inner surface of the cylinder, and it is then fastened in position by the set-screw D, and the distance between the joint $a$ and the foot of the bar A, which can be read off, as already explained, indicates the diameter of the cylinder.

In order to be able to remove the gage from the cylinder without disturbing the measurement, the set-screw $e$ is released, so that the foot-piece E can be raised clear of the surface of the cylinder, and then the gage can be removed.

It will be understood from this description that the object of the foot-piece E is to retain the graduated bar A and slide B in the required position in order to obtain a correct measurement; for instance, in the example shown in Fig. 1 the gage must have a radial position, and in the example shown in Fig. 2 it must have a diametrical position; but in using the gage for measuring the length of a steam-port or the size of any other rectilinear opening the foot-piece is not absolutely necessary, and a measurement of sufficient correctness can be obtained in many cases without using the foot-piece.

The graduated bar A can be made of any desired length, or, if desired, it can be made telescopic, so as to give a greater range to the instrument.

What I claim as new, and desire to secure by Letters Patent, is—

1. The combination, in a measuring-gage, of the graduated bar A, the slide B thereon, having the pointed end $a$, the spring C, acting on the bar and slide to extend them, the set-screw D, for holding the bar and the slide in a fixed position relatively to each other, and a foot-piece, E, adjustably secured on the bar, substantially as described.

2. The combination, in a gage, of the graduated bar A, the slide B thereon, the spring C, the set-screw D, the foot-piece composed of the socket $c$ and convex plate $d$, and the set-screw $e$, passing through the socket to bear on the bar, substantially as described.

3. A gage combining in its structure the following elements, to wit: the graduated bar A, the slide B thereon, the spring C, acting on the bar and slide to extend them, the set-screw D, for holding the bar and slide in fixed relation to each other, the sliding foot-piece E on the bar, and the set-screw $e$, for holding the foot in a fixed position on the bar, substantially as described.

4. A gage combining in its structure the graduated bar A, the tubular slide B thereon, provided with the pointed end $a$, the spring C, arranged in the slide to bear on the end of the bar to extend the bar and slide, the set-screw D, engaging a socket in the slide, to bear against the bar and hold it and the slide in fixed relation to each other, the tubular foot-piece on the bar, having the attached plate $b$ and sliding on the bar, and the set-screw $e$, engaging a screw-socket in the foot-piece, to bear on the bar and hold the foot-piece in its adjusted position thereon, substantially as described.

In testimony whereof I have hereunto set my hand and seal in the presence of two subscribing witnesses.

HENRY M. WATERMAN. [L. S.]

Witnesses:
W. HAUFF,
E. F. KASTENHUBER.